Feb. 20, 1934.  E. HOPKINSON  1,947,990
APPARATUS FOR FORMING HOLLOW ARTICLES
Filed Aug. 26, 1930
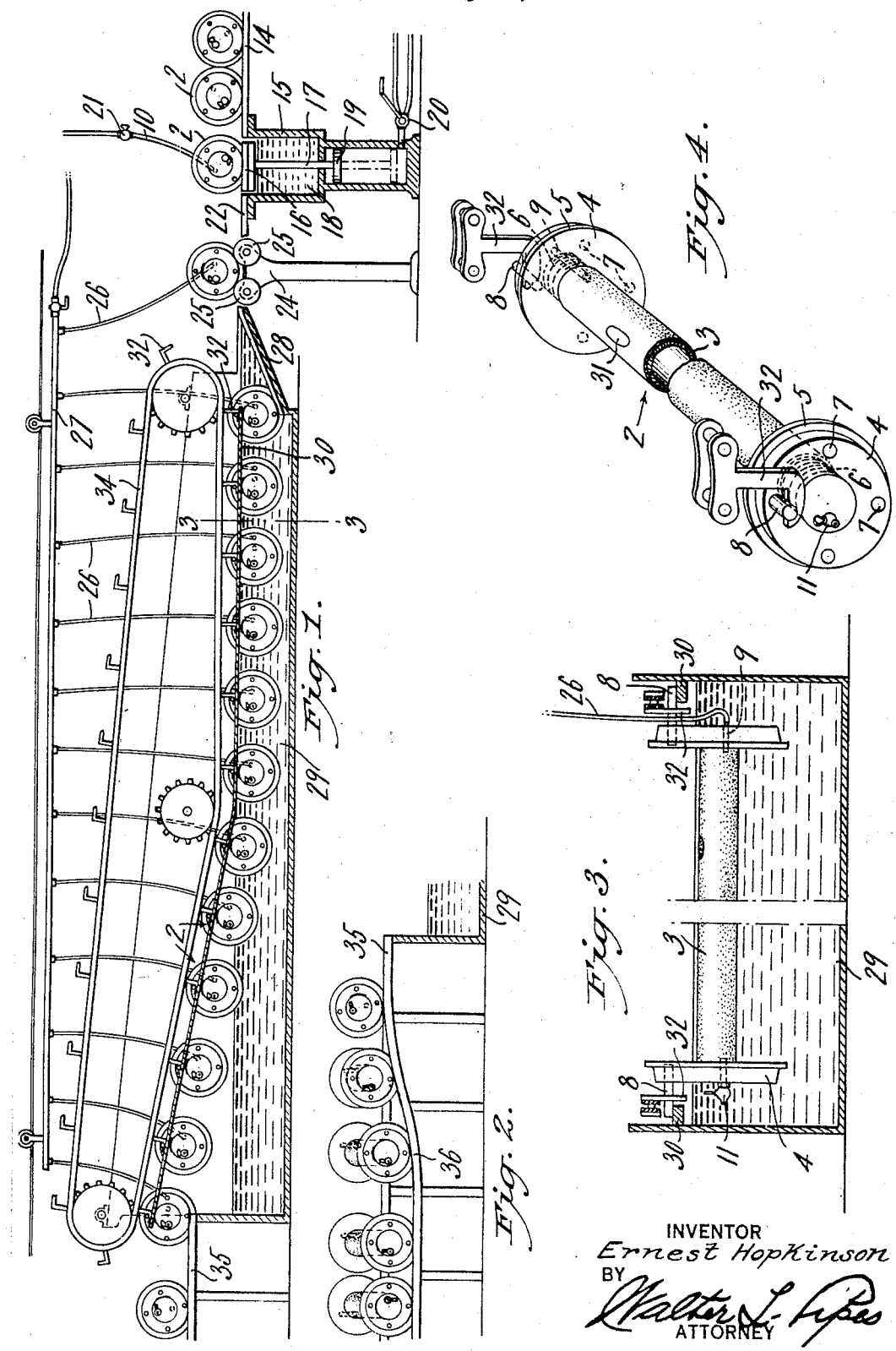
INVENTOR
Ernest Hopkinson
BY
ATTORNEY Patented Feb. 20, 1934

1,947,990

UNITED STATES PATENT OFFICE 1,947,990

APPARATUS FOR FORMING HOLLOW ARTICLES

Ernest Hopkinson, New York, N. Y., assignor to United States Tire Company, Incorporated, Indianapolis, Ind., a corporation of Indiana Application August 26, 1930. Serial No. 477,855

7 Claims. (Cl. 18—24)

My invention relates to methods and apparatus for forming hollow articles, and more particularly to methods and apparatus for forming tubular articles from an aqueous dispersion of rubber.

The present invention particularly relates to methods and apparatus for forming tubular stocks, such as are used in the manufacture of inner tubes by immersing a hollow porous form or mandrel in an aqueous dispersion of rubber while the interior of the form is maintained under a condition of partial vacuum to cause the deposition of a layer of rubber on the outer surface. In the case of inner tubes, it is sometimes desired to have a thicker outer or tread wall than the wall at the inner circumference. I accomplish this result by gradually or progressively withdrawing the mandrel or form from the rubber dispersion so as to deposit a progressively thicker wall along those portions of the mandrel which remain longest in the dispersion.

The present method and apparatus provide a substantially continuous operation in that successive mandrels are submerged, carried through a rubber dispersion and slowly withdrawn without substantially any material interruption in their movement.

I provide a plurality of mandrels having tubular porous portions which are supported by wheels at the opposite ends of each. At least one of the wheels is detachable to permit the removal of the finished rubber tube. The wheels of the successive mandrels are placed on a track or runway which carries them over a container. The successive mandrels are immersed in the first container while maintained under a condition of partial vacuum so that a porous coating of clay slip or the like is applied to each mandrel. The mandrels are then rotated so as to be in position to engage guiding means mounted in the container for the rubber dispersion. The mandrels roll down the sloping end of the container and engage guiding means which support the mandrels at a substantially uniform level for a considerable distance and then gradually raise the mandrels from the dispersion. A conveyor is provided for moving the mandrels along the guides. The mandrels are then released upon a runway which is provided with a tilted portion for facilitating the successive draining of the mandrels.

The accompanying drawing illustrates a present preferred embodiment of apparatus for practicing the invention, in which Figure 1 is a longitudinal sectional view of the apparatus;

Fig. 2 is a longitudinal view of the discharge end of the apparatus;

Fig. 3 is a transverse sectional view of the apparatus taken substantially along the section line 3—3 of Fig. 1; and Fig. 4 is a perspective view of a mandrel illustrating its co-operation with hooks for moving the same.

Referring to the drawing, a plurality of mandrels 2 are provided for shaping tubes of rubber. Each mandrel comprises a tubular porous section 3 over which a coating of clay or other porous material is applied. Each section 3 is supported by a pair of wheels 4 having flanges 5 for following a track or runway. At least one of the wheels is provided with threads 6 for engaging corresponding threads on the end of the section 3 so as to permit the removal of the wheel for stripping the mandrel. The wheels are each provided with a plurality of sockets 7 for the reception of pins or lugs 8. One end of the mandrel is provided with a tube 9 for the attachment of a suction line 10, while the other end is provided with a drain cock 11.

When a mandrel is assembled it is placed in a runway 14 which leads to a container 15 for applying a porous coating. The mandrel moves forward over the runway 14 until it rests on a platform 16 carried by a plunger 17 which extends upwardly through the clay slip 18, or the like, in the container 15. A piston 19 and a control valve 20 are provided for raising and lowering the plunger 17. When the mandrel is placed on the platform 16 the suction line 10 is slipped over the tube 9 and a valve 21 is opened to reduce the pressure within the mandrel. The valve 20 is then manipulated to lower the platform 16 for submerging the mandrel while it is maintained under a condition of partial vacuum. The surface of the mandrel is covered with a film or coating of porous material by the deposit of the solid content of the slip as the aqueous phase is drawn into the mandrel. The platform 16 is then raised and the mandrel moved onto a second section 22 of the runway over which it passes to a roll stand 24.

The roll stand 24 is provided with a plurality of rollers 25 which engage the wheels 4. The mandrel is rotated until one of the sockets 7 at each end of the mandrel is in upper position, when pins 8 are inserted. A suction line 26, which is connected to a movable manifold 27, is attached to the tube 9.

The mandrel is then positioned on a sloping end 28 of a container 29 for an aqueous dispersion of rubber, or the like. The dispersion may be either an artificial or a natural dispersion. It is also to be understood that the apparatus may be used in connection with liquid other than dispersions of rubber.

The distance along the sloping end 28 over which the mandrel rolls is so proportioned that as the mandrel rolls along, the pins 8 engage guide rails 30 mounted internally of the container 29 slightly above the normal level of the dispersion.

When the mandrels are supported on the guide rails 30, the porous section 3 is completely submerged in the dispersion and is maintained under a condition of reduced pressure so that the aqueous phase of the dispersion is drawn through the porous or clay coating on the mandrel and the rubber phase is deposited thereon. If desired, one or more valve patches 31 may be secured on each of the mandrels when it is on the roll stand 24. Preferably, the valve patches 31 are kept moistened in latex or are buttered with a latex paste prior to their immersion in the dispersion. The valve patches are maintained on the coating owing to the reduced pressure within the mandrel as it rolls down the end portion 28.

As soon as each mandrel comes to rest on the guide rails 30 the pins 8 are engaged by lugs or hooks 32 depending from an endless conveyor 34. The conveyor is driven by any suitable mechanism not shown. Each mandrel is moved forward along a substantially horizontal portion of the guide rail for such a distance that the sections 3 are given a uniform coating of rubber. By way of example, the length of the horizontal guide rails 30 may approximate two-thirds of the length of travel of each mandrel while in engagement with the dispersion.

Toward the rear end of the container 29 the guide rails gradually slope upwardly so that as the mandrels move therealong they are gradually and progressively withdrawn from the dispersion. This permits the deposition of a thicker coating of rubber on the lower or bottom portions of the mandrels than on the upper or inner portions where the valve patches 31 are positioned, if used. The valve patches are accordingly seated in the rubber coating deposited on each mandrel.

At the end of the inclined portions of the guide rails 30 the mandrels are released from the hooks 32 by operators and discharged onto a runway 35. At the same time the co-operating suction line 26 is disconnected. The runway 35 is provided with a depressed or tilted portion 36 so that as the mandrels roll along the runway 35 the ends carrying the drain cocks 11 are lowered. The drain cocks are then opened to permit the drainage of water contained in the mandrel.

From the runway 35 the mandrels may be fed into drying sheds, not shown, of sufficient capacity to permit the continuous feeding of mandrels through the apparatus. After the rubber deposited on the mandrels has been dried and/or cured one of the wheels is removed to permit the stripping of the mandrels. The stripped rubber may then be spliced to form an inner tube or cut into sections to form a plurality of tubes, as desired.

The present invention provides a substantially continuous operation in the forming of tubular shapes from aqueous dispersions. The progressive withdrawal from the several mandrels from engagement with the dispersion provides a progressively increasing wall thickness toward the area of last contact with the dispersion.

While I have herein shown and described a present preferred method and form of apparatus for manufacturing hollow articles, it is to be understood that the invention may be otherwise practiced and embodied without departing from the spirit of the invention and the scope of the appended claims.

Having thus described my invention, what I claim and desire to protect by Letters Patent is:

1. A mandrel for shaping hollow articles comprising a porous tubular portion, supporting wheels at the opposite ends thereof, at least one of which is removable, one of said ends having an opening therein for the connection of a conduit to create a condition of reduced pressure within said porous tubular portion, and adjustable means associated with said wheels for co-operation with mandrel guiding means.

2. Apparatus for shaping hollow articles comprising a shaping mandrel having wheels at the ends thereof and guide co-operating means, a container for coating material, a mandrel guide in the container, a receiving track for the mandrel, means for positioning the guide co-operating means to engage the guide when the mandrel is introduced into the container, a discharge track for the mandrel, and means for moving the mandrel through the container.

3. Apparatus for shaping hollow articles comprising a container for coating material, a mandrel guide in the container, means for positioning and introducing a rotatable porous mandrel into the container to engage the guide, means for moving the mandrel through the container along the guide, means for applying a condition of vacuum within the mandrel while in the container, and a run off track for the mandrel, said run off track having a tilted portion for facilitating the drainage of the mandrel.

4. Apparatus for shaping coated articles comprising a container for a coating substance, a mandrel guide therein, said container having a sloping end, and means for positioning a rotatable mandrel comprising guide engaging means so that the guide engaging means engage said guide at a predetermined point in the rotation of said mandrel as it moves along said sloping end of the container.

5. Apparatus for handling porous mandrels comprising a runway for the mandrels in a plurality of sections, means for applying a condition of partial vacuum to the mandrels, a container for a coating bath disposed between sections of the runway, and a plunger extending through said container and terminating in a platform movable into the plane of said sections for receiving a mandrel, lowering the mandrel into the container and returning it to the runway.

6. A mandrel comprising a tubular portion, wheels at the end thereof at least one of which is removable, said tubular portion having openings therein for the attachment of a suction line and for draining the mandrel.

7. A mandrel comprising a tubular portion, wheels at the end thereof at least one of which is removable, said wheels having openings therein for the selective attachment of lifting means.

ERNEST HOPKINSON.